(12) United States Patent
Cheng et al.

(10) Patent No.: US 11,074,366 B2
(45) Date of Patent: *Jul. 27, 2021

(54) AUTOMATIC MASKING OF SENSITIVE DATA

(71) Applicant: International Business Machines Corporation, Armonk, NY (US)

(72) Inventors: Ching-Wei Cheng, New Taipei (TW); Tzu-Ching Kuo, Taipei (TW); June-Ray Lin, Taipei (TW); Yi-Chun Tsai, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/599,677

(22) Filed: Oct. 11, 2019

(65) Prior Publication Data

US 2020/0042739 A1 Feb. 6, 2020

Related U.S. Application Data

(63) Continuation of application No. 15/939,561, filed on Mar. 29, 2018, now Pat. No. 10,489,608, which is a
(Continued)

(51) Int. Cl.
*G06F 21/62* (2013.01)
*H04L 9/06* (2006.01)
*G06F 21/50* (2013.01)

(52) U.S. Cl.
CPC ........ *G06F 21/6245* (2013.01); *H04L 9/0643* (2013.01); *G06F 21/50* (2013.01); *G06F 2221/032* (2013.01)

(58) Field of Classification Search
CPC ................ G06F 21/6245; G06F 21/50; G06F 2221/032; H04L 9/0643
See application file for complete search history.

(56) References Cited

U.S. PATENT DOCUMENTS

| | | | | |
|---|---|---|---|---|
| 7,343,551 B1 * | 3/2008 | Bourdev | ............... | G06F 40/174 715/224 |
| 8,121,991 B1 * | 2/2012 | Gabber | ............... | G06F 16/9558 707/695 |

(Continued)

OTHER PUBLICATIONS

Goldsteen et al., Application-Screen Masking: A Hybrid Approach. Retrieved from Internet on Apr. 6, 2017, URL: http://ieeexplore.ieee.org/document/7106392/, 3 pages.
(Continued)

*Primary Examiner* — Michael Pyzocha
(74) *Attorney, Agent, or Firm* — Schmeiser, Olsen & Watts, LLP; William Hartwell

(57) ABSTRACT

A masking system and method for automatically masking sensitive user information on a webpage is provided. The method includes the steps of identifying a location of the first user data of the first type of sensitive user information on the webpage, updating an initial path to the first user data to account for changes to the initial path detected in response to repeated visits to the webpage, wherein the updated initial path to the first user data is stored as a stable path, locating a second user data associated with a second type of sensitive user information on the webpage, by accessing a central database containing path information to a location of the second user data on the webpage, and masking the first user data and the second user data on the webpage, using the stable path and the path information obtained from the central database.

17 Claims, 13 Drawing Sheets

Related U.S. Application Data continuation of application No. 15/480,512, filed on Apr. 6, 2017, now Pat. No. 9,965,648.

(56) References Cited

U.S. PATENT DOCUMENTS

| | | | |
|---|---|---|---|
| 8,561,185 B1* | 10/2013 | Muthusrinivasan | G06F 21/6245 726/22 |
| 9,047,485 B2 | 6/2015 | Mastie | |
| 9,141,332 B2 | 9/2015 | Coleman et al. | |
| 9,268,947 B1 | 2/2016 | Jarlstrom et al. | |
| 9,361,469 B2 | 6/2016 | Thiyagarajan et al. | |
| 9,406,157 B2 | 8/2016 | Liu et al. | |
| 9,489,354 B1* | 11/2016 | Lee | G06F 40/166 |
| 9,965,648 B1 | 5/2018 | Cheng et al. | |
| 10,025,952 B1* | 7/2018 | Wang | G06F 21/6245 |
| 10,032,046 B1 | 7/2018 | Hayashi et al. | |
| 2006/0129463 A1 | 6/2006 | Zicherman | |
| 2006/0129635 A1* | 6/2006 | Baccou | G06F 16/9574 709/203 |
| 2008/0256101 A1* | 10/2008 | Kochan | G06F 3/065 |
| 2010/0121773 A1 | 5/2010 | Currier et al. | |
| 2010/0185546 A1* | 7/2010 | Pollard | G06Q 50/188 705/80 |
| 2011/0040983 A1 | 2/2011 | Grzymala-Busse et al. | |
| 2012/0215758 A1 | 8/2012 | Gottschalk, Jr. et al. | |
| 2013/0212465 A1* | 8/2013 | Kovatch | G06F 16/9577 715/234 |
| 2014/0115712 A1* | 4/2014 | Powell | H04L 63/20 726/26 |
| 2014/0123303 A1* | 5/2014 | Shukla | G06F 21/6254 726/26 |
| 2014/0188921 A1* | 7/2014 | Thomason | G06F 21/6245 707/758 |
| 2015/0113659 A1 | 4/2015 | D'Costa et al. | |
| 2015/0149557 A1 | 5/2015 | Mendez et al. | |
| 2015/0269383 A1* | 9/2015 | Lang | H04L 63/20 726/1 |
| 2015/0312259 A1 | 10/2015 | Alpha et al. | |
| 2016/0269417 A1* | 9/2016 | Saxena | H04L 63/06 |
| 2016/0283729 A1 | 9/2016 | Vidhani et al. | |
| 2017/0154021 A1* | 6/2017 | Vidhani | G06F 40/14 |
| 2017/0161520 A1 | 6/2017 | Lockhart, III et al. | |
| 2017/0177904 A1 | 6/2017 | Bilodeau et al. | |
| 2017/0213041 A1 | 7/2017 | Medvedev | |
| 2017/0286719 A1 | 10/2017 | Kirshnamurthy et al. | |
| 2017/0323026 A1* | 11/2017 | Le Bras | G06F 16/2358 |
| 2018/0173685 A1* | 6/2018 | Christodorescu | G06F 40/14 |
| 2018/0191764 A1* | 7/2018 | Chawla | H04L 63/12 |
| 2018/0276401 A1* | 9/2018 | Allen | G06F 21/6245 |
| 2018/0293403 A1 | 10/2018 | Cheng et al. | |
| 2021/0004471 A1* | 1/2021 | Brannon | |

OTHER PUBLICATIONS

Notice of Allowance (dated Jan. 3, 2018) for U.S. Appl. No. 15/480,512, filed Apr. 6, 2017.

Office Action (dated Mar. 15, 2019) for U.S. Appl. No. 15/939,561, filed Mar. 29, 2018.

Amendment (dated Jun. 17, 2019) for U.S. Appl. No. 15/939,561, filed Mar. 29, 2018.

Notice of Allowance (dated Jul. 25, 2019) for U.S. Appl. No. 15/939,561, filed Mar. 29, 2018.

* cited by examiner

```
html#facebook > body._4lh.timelineLayout._51x9.noFooter.fbx._-kb.sf._59l.gecko.mac.x1.Locale_en_US
> div._li > div#globalContainer > div#content > div > div#mainContainer > div#contentCol >
div#contentArea > div#pagelet_timeline_main_column > div#timeline_top_section >
div.fbTimelineTopSectionBase._6-d > div.fbTimelineSection.mtm.fbTimelineTopSection >
div#fbProfileCover > div#u_0_y > div._6-e > h1._6-f > a._8_2 > span#fb-timeline-cover-name
```
— 210

FIG. 5A

```
html#Stencil > body#yui_3_12_0_1_1472472777712_94 > div#MasterWrap > div#applet_p_30345894 >
div#yui_3_12_0_1_1472472777712_851 > div#yui_3_12_0_1_1472472777712_180 >
div#yui_3_12_0_1_1472472777712_200 > div#UH > div#uhWrapper >
table#yui_3_12_0_1_1472472777712_850 > tbody#yui_3_12_0_1_1472472777712_849 >
tr#yui_3_12_0_1_1472472777712_848 > td.UHCol3 > ul.Ta-end.Mx-10.Grid.Whs-nw.Mt-10.Tabbar-List
> li.tabbar-signin.Ta-j.tabbar.Grid-U.Pos-r.Pend-18.Mend-18.Maw-30.tabbar-loggedin > a.yucs-trigger.D-
ib.MouseOver.NoTextDecoration.W-100 > b.t-txt.MouseOver-TextDecoration.Ell.D-ib.Va-b.Lh-12
```
225 — 220

FIG. 5B

```
html#Stencil > body#yui* > div#MasterWrap > div#applet_p* > div#yui* > div#yui* > div#yui* > div#UH
> div#uhWrapper > table#yui* > tbody#yui* > tr#yui* > td.UHCol3 > ul.Ta-end.Mx-10.Grid.Whs-nw.Mt-
10.Tabbar-List > li.tabbar-signin.Ta-j.tabbar.Grid-U.Pos-r.Pend-18.Mend-18.Maw-30.tabbar-loggedin >
a.yucs-trigger.D-ib.MouseOver.NoTextDecoration.W-100 > b.t-txt.MouseOver-TextDecoration.Ell.D-
ib.Va-b.Lh-12
```
235 — 230

FIG. 5C

AUTOMATIC MASKING OF SENSITIVE DATA

This application is a continuation application claiming priority to Ser. No. 15/939,561, filed Mar. 29, 2018, now U.S. Pat. No, 10,489,608, issued Nov. 26, 2019, which is a continuation of Ser. No. 15/480,512, filed Apr. 6, 2017, U.S. Pat. No. 9,965,648, issued May 8, 2018.

TECHNICAL FIELD

The present invention relates to systems and methods of automatically masking sensitive user information, and more specifically to embodiments of a smart masking system for automatic masking of different types of sensitive user data displayed on a webpage shared to a third party.

BACKGROUND

Software technical support typically requires a user to send a screenshot or a video of a webpage to properly diagnose and troubleshoot problems. Similarly, software technicians use screenshots of webpages for educational purposes. The shared webpage screenshots often contain sensitive user information that the user does not want to release to a third party.

SUMMARY

An embodiment of the present invention relates to a method, and associated computer system and computer program product, for automatically masking sensitive information on webpage. A processor of a computing system obtains a first user data associated with a first type of sensitive user information. A location of the first user data of the first type of sensitive user information on the webpage is identified, the location being stored as an initial path. The initial path to the first user data is updated to account for changes to the initial path detected in response to repeated visits to the webpage, wherein the updated initial path to the first user data is stored as a stable path. A second user data associated with a second type of sensitive user information on the webpage is located, by accessing a central database containing path information to a location of the second user data on the webpage. The first user data and the second user data on the webpage, is masked using the stable path and the path information obtained from the central database.

BRIEF DESCRIPTION OF THE DRAWINGS

FIG. 5A depicts an embodiment of a path associated with a location of sensitive user data on the webpage, in accordance with embodiments of the present invention.

FIG. 5B depicts an embodiment of a new path associated with the location of the sensitive user data on the webpage, in accordance with embodiments of the present invention.

FIG. 5C depicts an embodiment of a stable path 230 associated with the location of the sensitive user data on the webpage 165, in accordance with embodiments of the present invention.

DETAILED DESCRIPTION

Software support teams often require users to record the user's usage of the software to fix defects triggered in a scenario. The recorded usage may be a screenshot or video of a user page containing sensitive user information that the user does not want shared. Current methods require the user or software support, before further sharing the webpage with sensitive user information, to mask the sensitive user information manually, or using a rule-based software application requiring preset rules for masking data to be entered by the user. For example, the user or software support team must use mosaic techniques to mask certain user sensitive information, or rely on current methodologies that detect a specific data presentation format (e.g. DD/MM/YYYY), which is limited to protecting sensitive user information that shares the specific format. In addition to being limiting, these techniques are time-consuming.

Thus, there is a need for automatically masking different types of sensitive user information.

Figure 1:
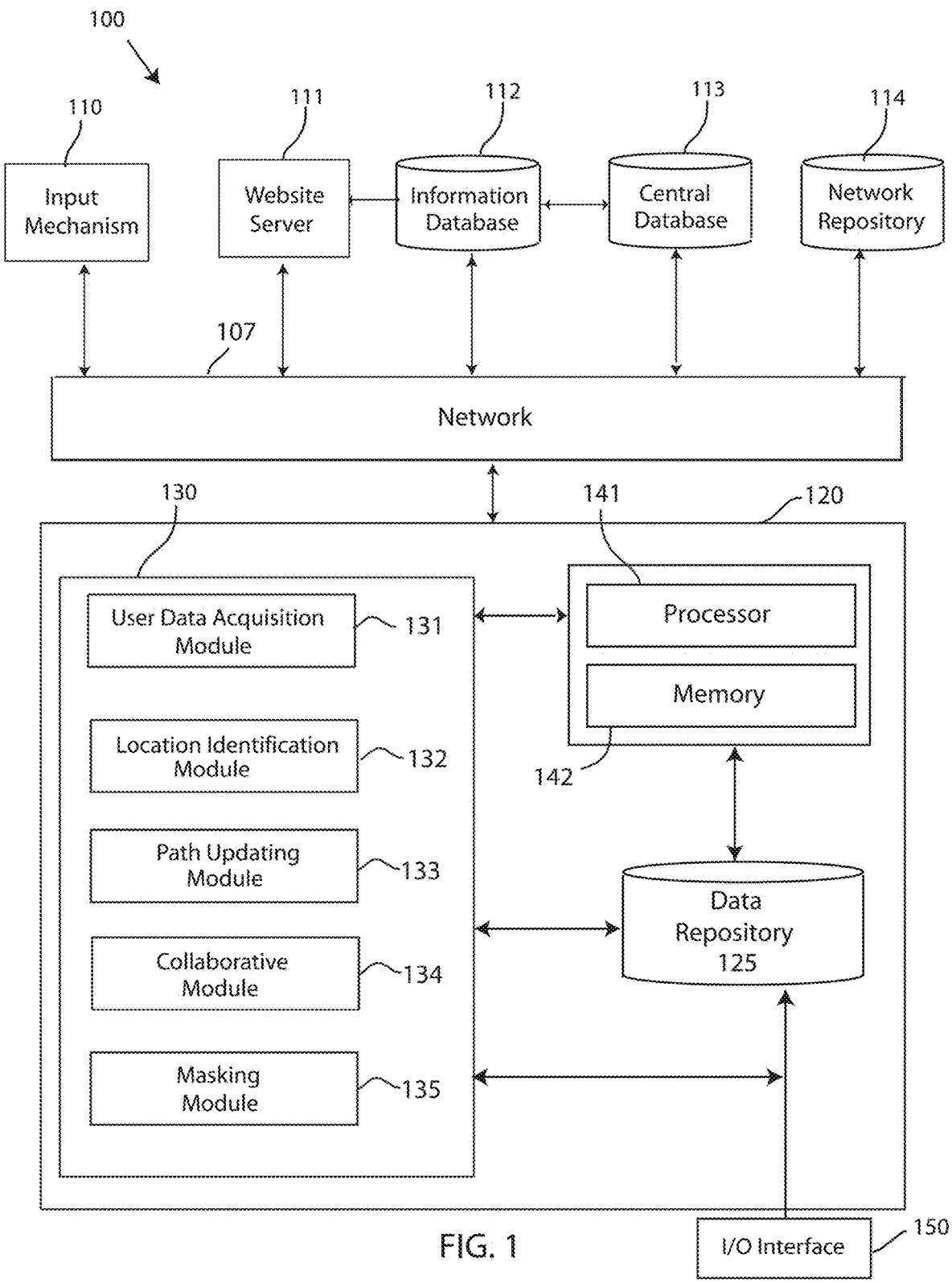
FIG. 1 depicts a block diagram of smart masking system, in accordance with embodiments of the present invention.

Referring to the drawings, FIG. 1 depicts a block diagram of smart masking system 100, in accordance with embodiments of the present invention. Embodiments of the smart masking system 100 may be a system for automatically masking different types of sensitive user information. The system 100 may be useful in situations where the user must share a screenshot of a web-based program, secure webpage/website, personal webpage, or a webpage or website containing sensitive user information to a software technical support team for diagnosing problems and effective troubleshooting. Further, embodiments of smart masking system 100 may be useful for sharing for training and/or educational purposes. Embodiments of the smart masking system 100 may include a computing system 120. Embodiments of the computing system 120 may be a computer system, a computer, a user computer, a mobile device, a mobile computing system, a personal digital assistant (PDA), a tablet computer, a smartphone, a desktop computer, a laptop computer, and the like.

Furthermore, embodiments of smart masking system 100 may include an input mechanism 110, website server 111, user information database 112, and a central database 113, communicatively coupled to a computing system 120 of the smart masking system 100 over a network 107. A network 107 may be the cloud. Further embodiments of network 107 may refer to a group of two or more computer systems linked together. Network 107 may be any type of computer network known by individuals skilled in the art. Examples of computer networks 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the computer network 107 may be a peer-to-peer network in some embodiments, wherein in other embodiments, the network 107 may be organized as a client/server architecture.

In some embodiments, the network 107 may further comprise, in addition to the computer system 120, a connection to one or more network accessible knowledge bases containing information of the user, network repositories or other systems connected to the network 107 that may be considered nodes of the network 107. In some embodiments, where the computing system 120 or network repositories allocate resources to be used by the other nodes of the network 107, the computer system 120 and network repository may be referred to as servers.

The network repository 114 may be a data collection area on the network 107 which may back up and save all the data transmitted back and forth between the nodes of the network 107. For example, the network repository 114 may be a data center saving and cataloging user preferences or permissions allowed, granted, and/or simulated regarding types of sensitive personal information that the user considers sensitive, to generate both historical and predictive reports regarding a particular user. In some embodiments, a data collection center housing the network repository 114 may include an analytic module capable of analyzing each piece of data being stored by the network repository 114. Further, the computer system 120 may be integrated with or as a part of the data collection center housing the network repository. In some alternative embodiments, the network repository may be a local repository that is connected to the computer system 120.

Further, embodiments of the computing system 120 may include an I/O interface 150, which may enable any communication process performed between the computer system 120 and the environment outside of the computer system 120. Input to the computing system 120 may enable the signals or instructions sent to the computing system 120, for example information provided by the user to the computing system 120, while output may enable the signals sent out from the computer system 120. Embodiments of the I/O interface 150 may also be connected to the computing system 120 over a network, such as network 107.

Referring still to FIG. 1, embodiments of the computing system 120 may receive sensitive user data via I/O interfaces 150. Input devices or input mechanisms associated with the I/O interfaces 150 may be a touchscreen of a mobile device. Other inputs may be used to collect user data or preferences, such as one or more connected microphones positioned nearby the user or a built-in microphone of the user's mobile device to allow voice-commands, a keyboard, a webcam, mouse, touchpad, stylus, and the like, or other peripheral devices connected to the computing system 120 over the network 107 or via Bluetooth, IR, or other short range communication networks.

Embodiments of the computer system 120 may be equipped with a memory device 142 which may store the user selections, and a processor 141 for implementing the tasks associated with the smart masking system 100. In some embodiments, a masking application 130 may be loaded in the memory 142 of the computer system 120. The computing system 120 may further include an operating system, which can be a computer program for controlling an operation of the computing system 120, wherein applications loaded onto the computing device 120 may run on top of the operating system to provide various functions.

Furthermore, embodiments of computer system 120 may include the masking application 130. Embodiments of the masking application 130 may be an interface, an application, a program, or a combination of modules. In an exemplary embodiment, the masking application 130 may be a browser plug-in.

The masking application 130 of the computing system 120 may include a user data acquisition module 131, a location identifying module 132, a path updating module 133, a collaborative module 134, and a masking module 135. A "module" may refer to a hardware based module, software based module or a module may be a combination of hardware and software. Embodiments of hardware based modules may include self-contained components such as chipsets, specialized circuitry and one or more memory devices, while a software-based module may be part of a program code or linked to the program code containing specific programmed instructions, which may be loaded in the memory device of the computer system 120. A module (whether hardware, software, or a combination thereof) may be designed to implement or execute one or more particular functions or routines.

Embodiments of the user data acquisition module 131 may include one or more components of hardware and/or software program code for obtaining a first user data associated with a first type of sensitive user information. Embodiments of a first type of sensitive user/business information may be sensitive personal/business confidential information that can be distinctively displayed on a webpage. The webpage displaying the sensitive information may be a webpage of a website, such as a social media website, wherein a user or business must log-in to access the contents and/or view of the displayed sensitive information. Further, embodiments of the webpage may be a webpage of a web-based or cloud-based software program that requires the user or business entity employees to log in, securely or otherwise, to access and/or view the sensitive information.

Figure 2:
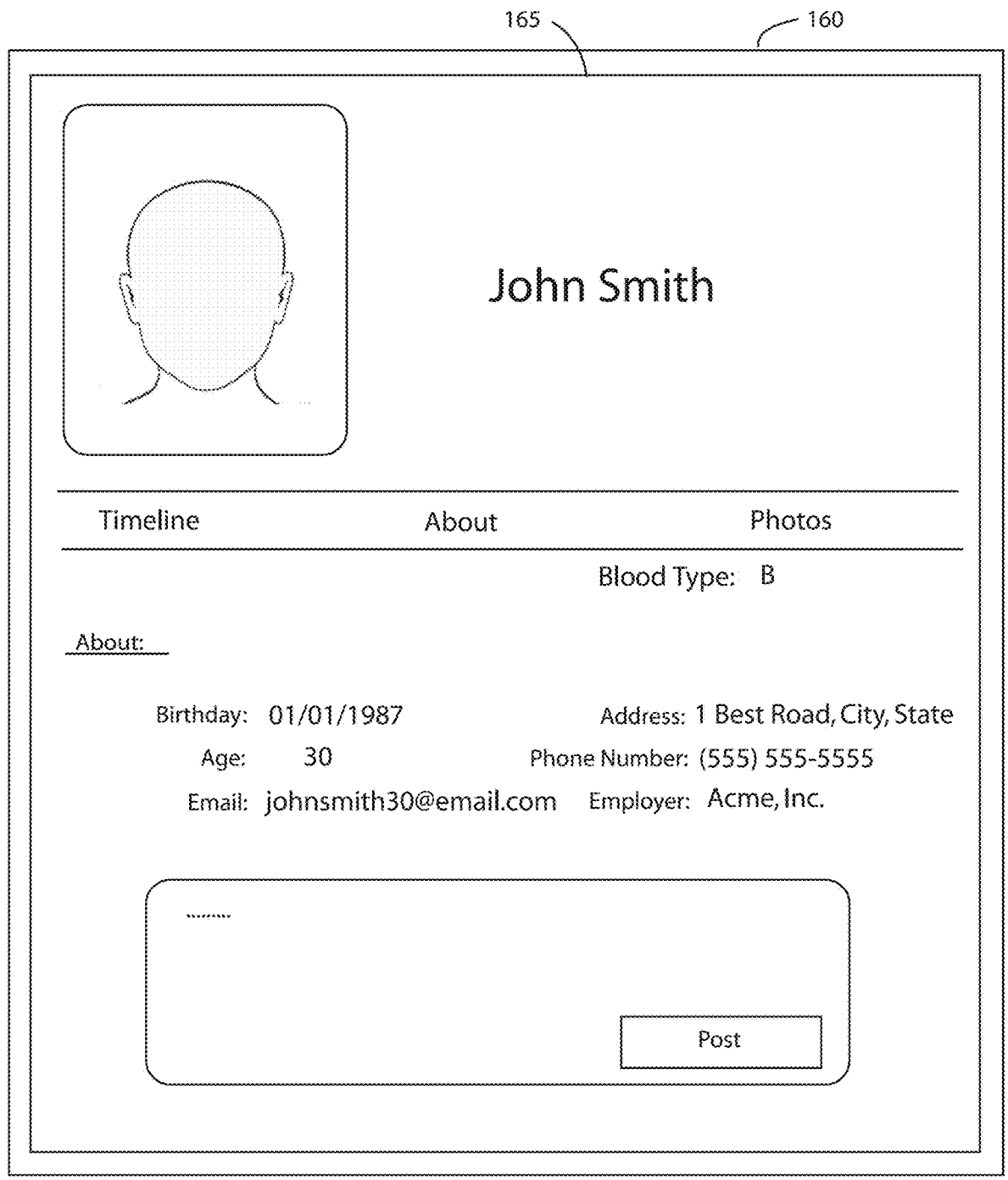
FIG. 2 depicts an embodiment of a webpage displaying sensitive user information of the first type of sensitive information and a second type of sensitive user information, in accordance with embodiments of the present invention.

FIG. 2 depicts an embodiment of a webpage 165 displaying sensitive user information of the first type of sensitive information and a second type of sensitive user information, in accordance with embodiments of the present invention. The webpage 165 may be displayed on a display 160 of the computing system 120. In the exemplary embodiment shown in FIG. 2, sensitive user data associated with the first type of sensitive user information is shown, including a name (i.e. John Smith), a birthday (i.e. Jan. 1, 1987), an email address (i.e. johnsmith@email.com), an address (i.e. 1 Best Road, City, State), a phone number (i.e. (555)-555-

5555), and an employer (i.e. Acme, Inc.). The first type of sensitive user data or business data may be personal to the user or confidential to the business, and may also be identified by a locator scanning the webpage based on the distinctiveness of the information. The distinctiveness of the data/information may refer to a distinctiveness or uniqueness as compared to other text or images displayed on the website. For example, a user's full name located on a webpage may be distinct and unique as compared to other text on the webpage, such that the masking application 130 can identify and/or locate a position of the user's full name on a webpage among other text, as described in greater detail infra. Embodiments of the first type of sensitive user information may be a full name of the user, an address of the user, an employer of the user, a phone number of the user, a home phone number of the user, a mobile phone number of the user, a level of education of the user, a social security number of the user, a bank account information of the user, an account number for various accounts of the user, including utilities, internet provider, television provider, landscaping company, medical provider, insurance provider, and the like. Embodiments of the first type of sensitive information may also be sensitive information of a business or entity, other than an individual. For example, the first type of sensitive business information may be a business address, a client list, vendor information, vendor contacts, business partners, executives of a company, employee directory/profiles, organizational structure, email addresses, and the like.

In the exemplary embodiment shown in FIG. 2, sensitive user data associated with the second type of sensitive user information is also shown, including a blood type (i.e. B) and an age (i.e. 30). The second type of sensitive user data or business data may be personal to the user or confidential to the business, but a locator may experience some difficulty in identifying the data by scanning the webpage, based on a lack of distinctiveness of the data/information. For example, while a user's full name located on a webpage may be distinct and unique as compared to other text on the webpage, the capital letter "B" may be less distinct and unique, such that the masking application 130 may not be able to confidently or accurately identify and/or locate a position of the user's blood type on a webpage among other text, as described in greater detail infra. In particular, the capital letter B is located twice in the exemplary webpage 165, which means the masking application 130 would have to perform additional checks and expend additional computational resources to determine the position of the "B" that corresponds to the user's blood type. If a webpage has multiple paragraphs of text, locating the "B" by scanning the webpage may be even more difficult or complex. Embodiments of the second type of sensitive information may be less distinctive, short, contain few characters, include a common phrase or letter, and the like. A specific example of the second type of sensitive user information may be a blood type of a user, an age of the user, eye color of the user, hair color of the user, height of the user, weight of the user, gender or sexual orientation of the user, and the like. Embodiments of the second type of sensitive information may also be sensitive information of a business or entity, other than an individual.

Further, certain sensitive data/information may be associated with a first type of sensitive information for one website, while being associated with the second type of sensitive data/information on another website. For example, a layout, look, format, structure, text volume, and other features, characteristics, and functions of the website/webpage may affect whether a user or business data is associated with the first or second type of sensitive data. Additionally, whether a position of the user or business data displayed on the webpage can be identified by scanning the webpage may be determinative of whether user data is associated with the first or second type of sensitive user data.

Embodiments of the data acquisition module 131 may obtain, receive, access, pull, locate, etc., a first user data (e.g. a full name of a user) from an information source. Embodiments of the information source may be a remote storage device, such as information database 112, or a local storage device, such as data repository 125, browser cache, and the like. In an exemplary embodiment, the first user data may be obtained from a browser cache running on computing system 120, wherein the browser uses autofill functions. For example, users of computing device 120 may input the users' personal information into a particular website or webpage. A browser equipped with an autofill application may save the users' personal information as the user data is entered for a particular data field, and then the browser running the autofill application may automatically populate a data field with the user's personal information previously manually entered by the user. Accordingly, the user's personal information/data that is saved in a browser's cache may be accessed by the data acquisition module 131 to determine and/or obtain a first user data, such as a name of the user. In other embodiments, the user's personal information that is entered and saved as a function of the autofill process may be stored in the data repository 125 of the computing system 120 in addition to being saved in the browser's cache. Embodiments of the data acquisition module 131 may access and/or query the data repository 125, or other storage mediums coupled to the computing system 120 to obtain user or business data, associated with the first type of sensitive information.

Additionally, sensitive user or business information may be received by the computing system 120 from other sources or techniques. In one embodiment, the computing system 120 may receive or otherwise obtain sensitive data via I/O interface 150. For instance, a spreadsheet of vendor names may be loaded onto the computing system 120 via a USB drive. In another embodiment, the computing system 120 may receive sensitive data/information from an input mechanism 110 coupled to the computing system 120 over network 107. Embodiments of an input mechanism 111 may be a wearable device, a smart watch, a mobile phone, a sensor, a dedicated computing chip that stores medical and personal data relating to a person, or other input devices or sensors that may transmit sensitive user or business data to the computing system 120. Accordingly, embodiments of the data acquisition module 131 may obtain sensitive user or business data associated with a first type of sensitive information from one or more information sources. The data acquisition module 131 may obtain the sensitive user or business data so that the masking application 130 knows which displayed data to be located on the webpage and eventually masked.

Figure 3:
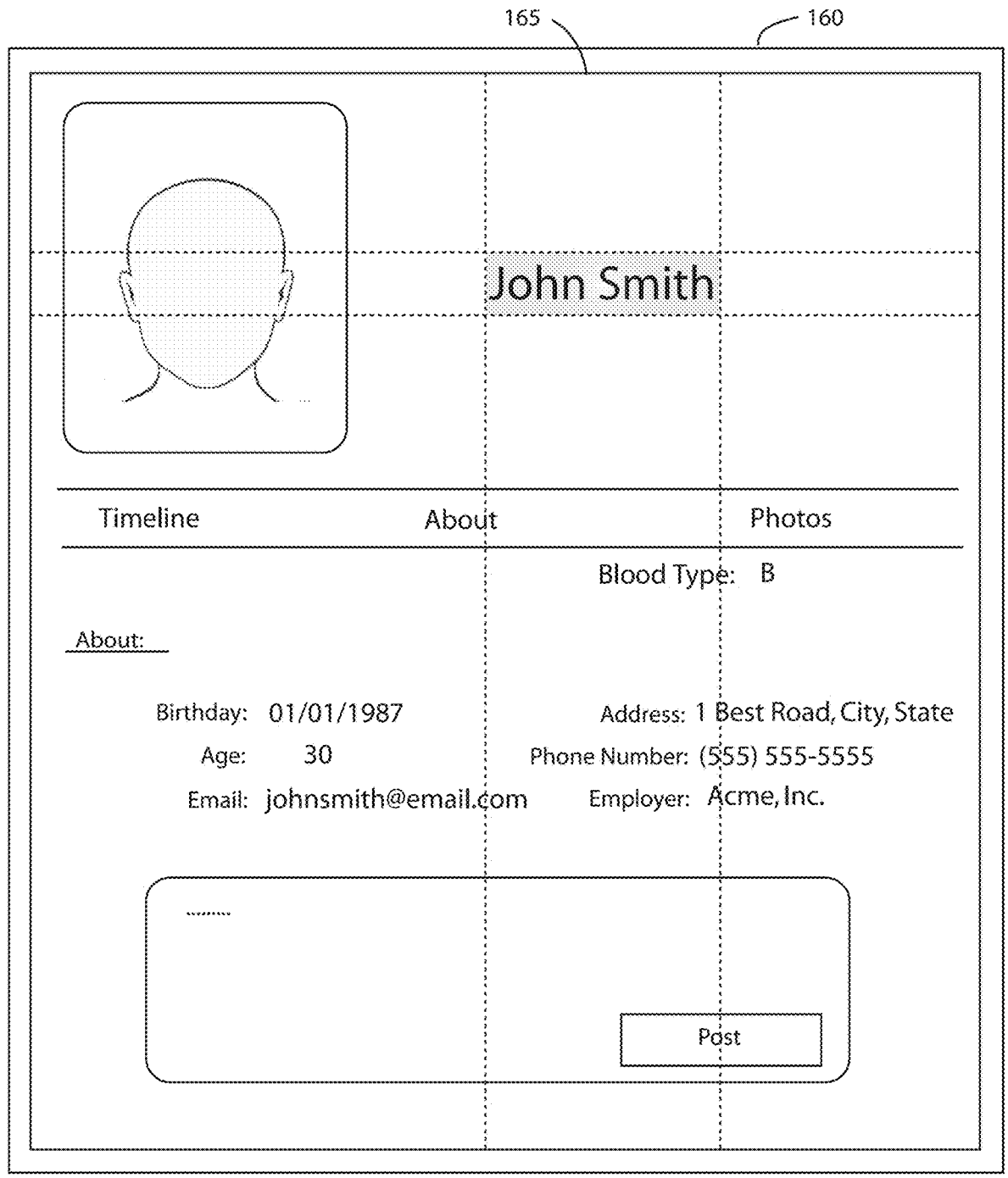
FIG. 3 depicts an embodiment of the webpage, wherein a location of a first sensitive user data on the webpage has been identified, in accordance with embodiments of the present invention.
Figure 4:
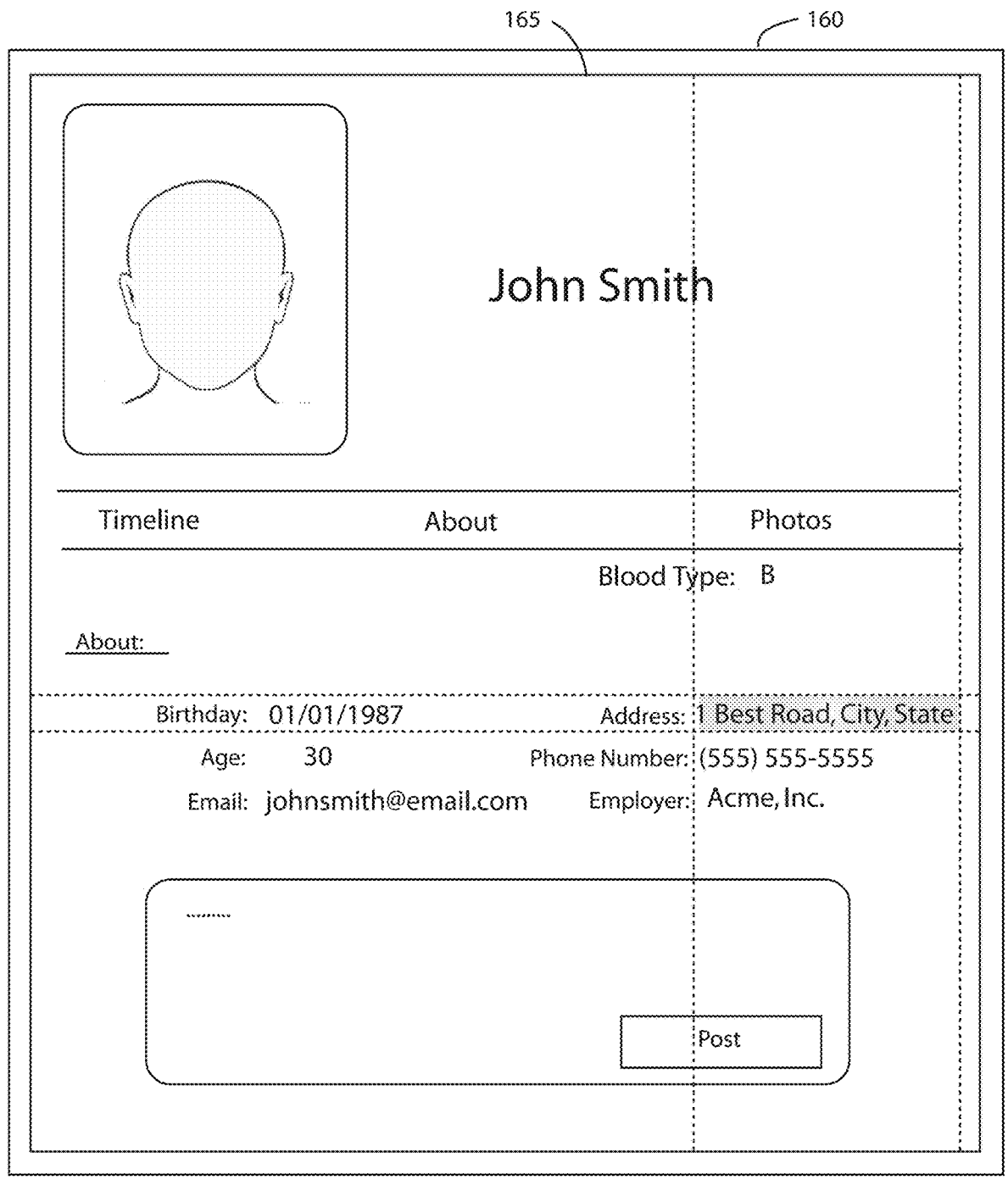
FIG. 4 depicts an embodiment of the webpage, wherein a location of a second sensitive user data on the webpage has been identified, in accordance with embodiments of the present invention.

Referring back to FIG. 1, embodiments of the computing system 120 may further include a location identification module 132. Embodiments of the location identification module 132 may include one or more components of hardware and/or software program code for identifying a location of the first user data of the first type of sensitive user information on the webpage. For instance, the location identification module 132 may locate or otherwise identify a location or a position of the first user data on the webpage, the first user data being obtained by the data acquisition module 131 so the location identification module 132 knows what text/data/information to search for on the webpage. FIG. 3 depicts an embodiment of the webpage 165, wherein a location of a first sensitive user data on the webpage 165 has been identified, in accordance with embodiments of the present invention. By scanning the webpage 165, the location identifying module 132 may determine a precise location or positioning of the user data being displayed on the webpage 165. In the example depicted by FIG. 3, a positioning of the user data "John Smith" has been identified, which is a name of the user. FIG. 4 depicts an embodiment of the webpage 165, wherein a location of a second sensitive user data on the webpage 165 has been identified, in accordance with embodiments of the present invention. By scanning the webpage 165, the location identifying module 132 may determine a precise location or positioning of additional user data being displayed on the webpage 165. In the example depicted by FIG. 4, a positioning of the user data "1 Best Road, City, State" has been identified, which is an address of the user. The user data fields may be scanned and located simultaneously or sequentially.

Furthermore, the location of the sensitive user data can be stored as an initial path. FIG. 5A depicts an embodiment of a path 210 associated with a location of sensitive user data on the webpage 165, in accordance with embodiments of the present invention. For example, the location identification module 132 may find the location, which may then determine a directory and eventually a path name associated with the user data being displayed, at that location on the website. The paths may be a CSS path or X path. The path name may then be stored as the initial path 210, which allows the masking application 130 to know, in addition to the fact that the user data identified is sensitive information (i.e. from the data acquisition module 131 obtaining the sensitive information), the precise location where masking should occur on the particular website. The initial path 210 may be stored locally on the computing system 120 or may be stored on a remote server or other computer readable storage device coupled to the computing system 120.

Embodiments of the computing system 120 may further include a path updating module 133. Embodiments of the path updating module 133 may include one or more components of hardware and/or software program code for updating the initial path to the first user data to account for changes to an initial path detected in response to repeated visits to the webpage. For instance, each time a user visits the webpage, the location identification module 132 may locate the sensitive user data and obtain a new path to the sensitive data, as described above. The new path(s) may differ from the initial path, and may also be stored. For example, the new paths may include additional values (e.g. numbers) in the path name, which may not be present in the initial path. In some embodiments, the additional or new value may be attributed to a time difference between when the initial path was determined and when the new path was determined by the masking application 130. If a user visits a webpage at a later point in time, values in the path associated with the location of the sensitive user data may be added or inserted to reflect the different times the webpage was visited. FIG. 5B depicts an embodiment of a new path 220 associated with the location of the sensitive user data on the webpage 165, in accordance with embodiments of the present invention. New path 220 may include new values 225 (i.e. shown in boxes for ease of viewing). Embodiments of the new values 225 may be numerical values, integers, the like, that may represent a change from the initial path, such as a time difference. However, the presence of the new values 225 may increase a probability that the actual location as associated with the initial path will be inaccurate, or otherwise faulty. Thus, embodiments of the path updating module 133 may be referred to as a trainer because each website or webpage may be trained by the path updating module 133 by eliminating or replacing the new values to arrive at a stable path, which may be a path that is stable and resistant to the changes due to time differences resulting from repeated visits to webpages.

FIG. 5C depicts an embodiment of a stable path 230 associated with the location of the sensitive user data on the webpage 165, in accordance with embodiments of the present invention. For instance each of the new values 225 may be eliminated and/or replaced by a token value 235. A token value 235 may be represented by a character, such as an asterisk, and may be a placeholder or token character such that each new path resembles the previous new path, arriving at the stable path 230. The token value 235 is not concerned with numbers, and can be used to replace the numbers so that the newest paths become more and more alike, which can be read by the computing system 120 to accurately provide location information of the sensitive date on the webpage 165. Accordingly, embodiments of the update module 133 updates the initial path to arrive at a stable path, which may be used more confidently to provide location information of the sensitive user data displayed on the webpage 165 because the stable path 230 can be resistant to changes to the paths resulting from accessing a webpage at a different time. The stable path 230 may be stored by the computing system 120.

Figure 6A:
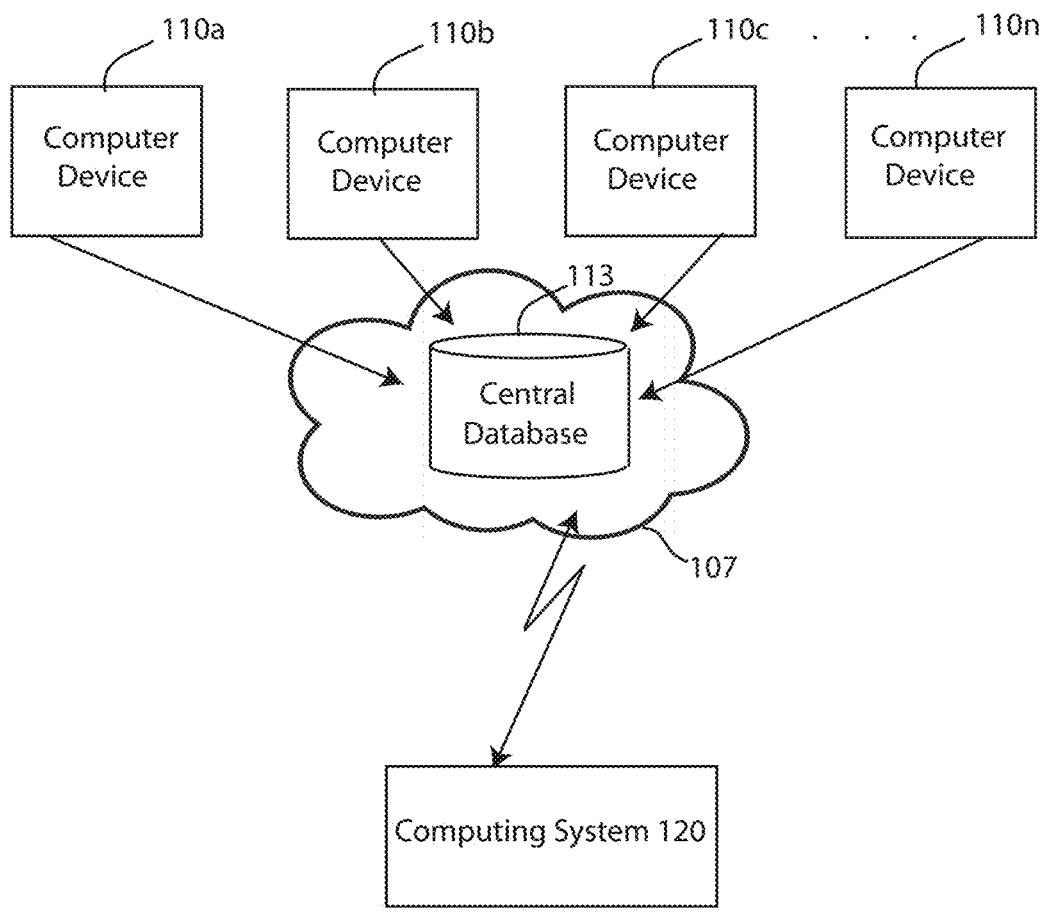
FIG. 6A is a block diagram of a central database and a plurality of computer devices, in accordance with embodiments of the present invention.

With reference again to FIG. 1, embodiments of the computing system 120 may also include a collaborative module 134. Embodiments of the collaborative module 134 may include one or more components of hardware and/or software program code for locating a second user data associated with a second type of sensitive user information on the webpage 165. For instance, embodiments of the collaborative module 134 may access a central database 113 containing path information to a location of the second user data for a given webpage. FIG. 6A is a block diagram of a central database 113 and a plurality of computer devices 110a, 110b, 110c . . . 10n, in accordance with embodiments of the present invention. Embodiments of the central database 113 may be a central hub, a central repository, a cloud database, a cloud server a data pool, a server, multiple servers, a shared hash pool, and the like. In an exemplary embodiment, the central database 113 may be a cloud storage device(s), configured to receive path information from the computing devices 110a, 110b, 110c . . . 10n. Embodiments of the central database 113 may be located in the network 107, such as a cloud computing network. Embodiments of the central database 113 may be accessible by the computing system 120 over network 107. A network 107 may be the cloud. Embodiments of the computing devices 110a, 110b, 110c . . . 110n may be a mobile device, a mobile computing device, a smartphone, a tablet, a cellular phone, desktop computer, laptop computer, or other computing device, operated by other users visiting/accessing the webpage 165. Each of the computing devices 110a, 110b, 110c . . . 10n may store or otherwise transmit path information associated with the second type of sensitive data for various webpages, wherein the computing devices 110a, 110b, 110c . . . 10n have previously identified the location of the second type of sensitive on a particular website, using techniques described herein, or other methods, such as manual methods or rule-based software applications. The path information may be automatically sent to the central database 113 in response to the detection or determination of path information.

Figure 6B:
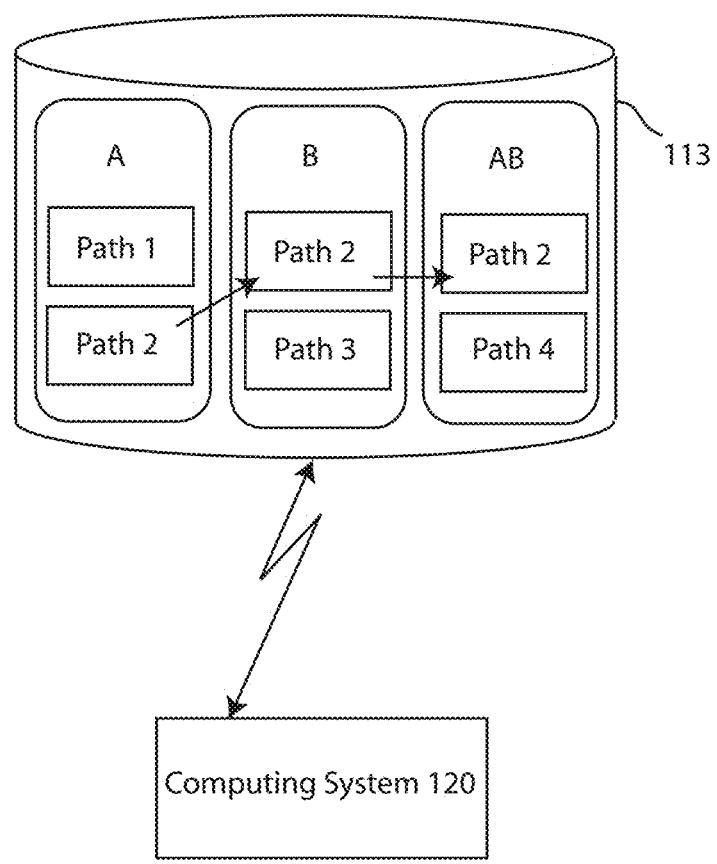
FIG. 6B is a block diagram of a collaborative use of the path information contained in the central database, in accordance with embodiments of the present invention.

Thus, embodiments of collaborative module 134 may locate a position of the second type of sensitive information on a webpage by accessing the central database 113 to learn the path information, as opposed to, for example, scanning the webpage as described above. The correct path information entry retrieved from the central database 113 may be discovered by narrowing down possible path information entries that are close to an intersection of the second type of sensitive user data, determined by scanning the webpage. In other embodiments, the correct path entry may be retrieved from the central database 113 based on website information and known data field locations on the website. The paths obtained from the central database 113 may be stored along with the initial paths and the stable paths, either locally or remotely. The central database 113 being accessible by the collaborative module 134 may allow for an exchange of paths anonymously with other online users to collaboratively confirm the paths are correct for less-distinctive user or business sensitive information. FIG. 6B is a block diagram of a collaborative use of the path information contained in the central database 113, in accordance with embodiments of the present invention. In FIG. 6B, the central database 113 includes path information for blood type identification (i.e. A, B, AB). In the shared pool (i.e. central database 113), blood type A is found in path1 and path2; type B is found in path2 and path3; type AB is found in path2 and path4. If the user of the computing system 120 has blood type A, the computing system 120 can leveraging information from the other users who are type B and AB to calculate an intersection of the found paths to identify the correct path, which is path2.

Further, embodiments of the collaborative module 134 may also utilize the central database 113 to confirm an accuracy of a stable path determined for more distinctive data (e.g. first type of sensitive data) obtained via scanning the webpage. For example, the masking application 130 loaded on a user device may transmit path information detected by scanning a webpage to the central database 113 to be used by other online users for confirmation, etc., or to otherwise bypass the scanning step. Likewise, other online users may transmit path information detected by scanning a webpage to the central database 113 to be used by the computing system 120 for confirmation, etc., or to otherwise bypass the scanning step.

To protect a privacy of online user data transmitted to the central database 113, each entry to the central database 113 may be hashed, such that the underlying data (e.g. users' blood type, etc.), may not be hacked or otherwise unlawfully decrypted. The hashing of the entries to the central database 113 may be hashed according to various encrypting techniques. Moreover, each path information entry into the central database 113 may be assigned a timestamp, which can be useful for maintaining the central database 113 and ensuring that the database 113 includes the most up-to-date path information. The central database 113 may be maintained by analyzing the timestamp associated with a path information entry, and removing old entries from the central database 113. Further, embodiments of the central database 113 may be maintained by removing path information that no longer corresponds to a correct location on the webpage, which may occur as the website adapts and changes a layout, look, structure, etc. embodiments of the central database 113 may further be maintained by continuously receiving new path information from other online users, and the reporting of incorrect path information entries. Thus, embodiments of the central database 113 may evolve with adapting and changing websites.

Referring back to FIG. 1, embodiments of the computing system 120 may include a masking module 135. Embodiments of the masking module 135 may include one or more components of hardware and/or software program code for masking the first user data and the second user data on the webpage, using the stable path and the path information obtained from the central database 113. For instance, embodiments of the masking module 135 perform masking operations to the sensitive user or business information/data. The masking module 135 may know exactly where to employ the masking operations on a website based on the paths obtained by the masking application 130. The masking of different types of sensitive information may be done automatically to the various data fields of a given website, in accordance with embodiments of the masking application 130. Further, embodiments of the masking module 135 may perform selective masking to various sensitive information fields on a website. The selection of which types of sensitive data is masked may be based on user preferences stored in the data repository 125 the computing system or the website server 111.

Figure 7:
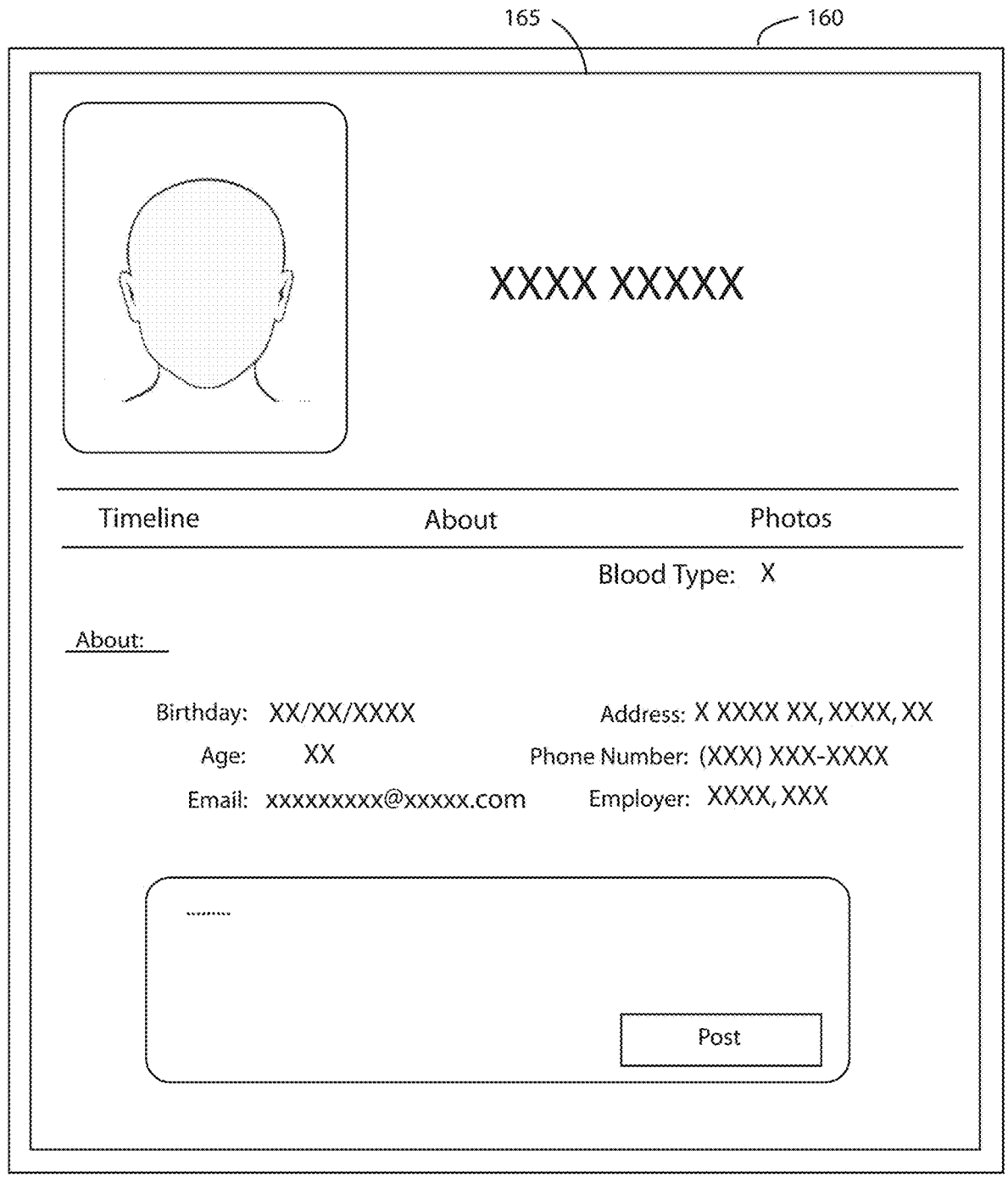
FIG. 7 depicts an embodiment of a webpage masking sensitive user information of the first type of sensitive information and a second type of sensitive user information, in accordance with embodiments of the present invention.

FIG. 7 depicts an embodiment of a webpage masking sensitive user information of the first type of sensitive information and a second type of sensitive user information, in accordance with embodiments of the present invention. The masking module 135 may mask or otherwise distort, cover, block, screen, scramble, etc. sensitive user data, the location of which may be precisely determined by the masking application 130. In an exemplary embodiment, a user having a need for software technical support has been sent a request to send a screenshot of the webpage 165. Before sending a screenshot or a video to the technical support team, the user may activate the masking application 130 (e.g. on/off toggle as a browser plug-in). In response to activation, the masking application 130 may determine the paths to the sensitive user information pertaining at least to sensitive data associated with the first type (e.g. distinctive sensitive user information, unique text strings, etc.) by scanning the webpage 165, and may determine the paths to the sensitive user information pertaining to sensitive data associated with the second type (e.g. less-distinctive, generic text/characters, etc.) by leveraging a collaborative central database 113. The masking module 135 of the masking application 135 may then perform masking operations at those determined locations on the webpage 165. The masked version of the webpage, for example as shown in FIG. 7, may be shared to a third party, such as the technical support team. Likewise, the technical support team may utilize the smart masking system 100, in response to receiving shared unmasked webpage from a user.

Various tasks and specific functions of the modules of the computing system 120 may be performed by additional modules, or may be combined into other module(s) to reduce the number of modules. Further, embodiments of the computer or computer system 120 may comprise specialized, non-generic hardware and circuitry (i.e., specialized discrete non-generic analog, digital, and logic based circuitry) for (independently or in combination) particularized for executing only methods of the present invention. The specialized discrete non-generic analog, digital, and logic based circuitry may include proprietary specially designed components (e.g., a specialized integrated circuit, such as for example an Application Specific Integrated Circuit (ASIC), designed for only implementing methods of the present invention). Moreover, embodiments of the smart masking system 100 may improve computer technology, whereby automatically masking sensitive data for varying types of sensitive information, utilizing webpage data collected by several different devices to provide collaborative path information, which would have previously required manual masking or individual machines having discrete, limiting software. Further technical advantages include auto detection of private data usage, path remembering by the computing system 120 to automatically mask sensitive information, no need for inputting rules to the software application, selective masking, and adaptive system to changing to websites.

Figure 8:
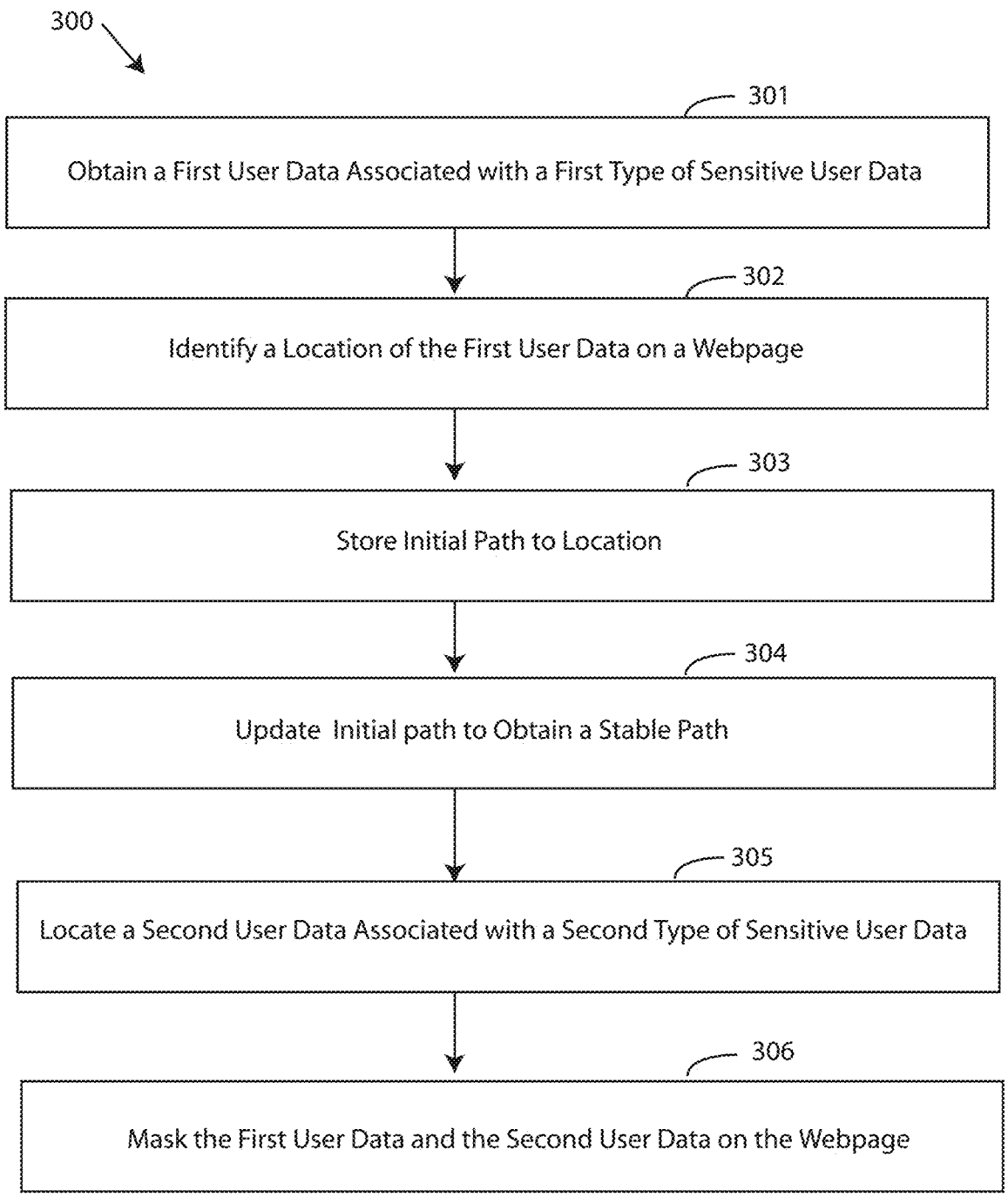
FIG. 8 depicts a flow chart of a method for automatically masking sensitive user information on a webpage, in accordance with embodiments of the present invention.

Referring now to FIG. 8, which depicts a flow chart of a method 300 for automatically masking sensitive user information on a webpage, in accordance with embodiments of the present invention. One embodiment of a method 300 or algorithm that may be implemented for automatically masking sensitive user information on a webpage in accordance with the smart masking system 100 described in FIGS. 1-7 using one or more computer systems as defined generically in FIG. 10 below, and more specifically by the specific embodiments of FIG. 1.

Embodiments of the method 300 for automatically masking sensitive user information on a webpage, in accordance with embodiments of the present invention may begin at step 301 wherein a first user data associated with a first type of sensitive data is obtained. The sensitive data may be obtained from one or more information sources. Step 302 identifies a location of the first user data on a webpage. For instance, various scanning techniques may be used to determine a position of the first user data, which may allow a path to be determined. Step 303 stores the initial path determined by the identifying. Step 304 updates the initial path to obtain a stable path, which can be resistant to changes to the path(s) over time, based on an access point in time of a particular website by the user.

Figure 9:
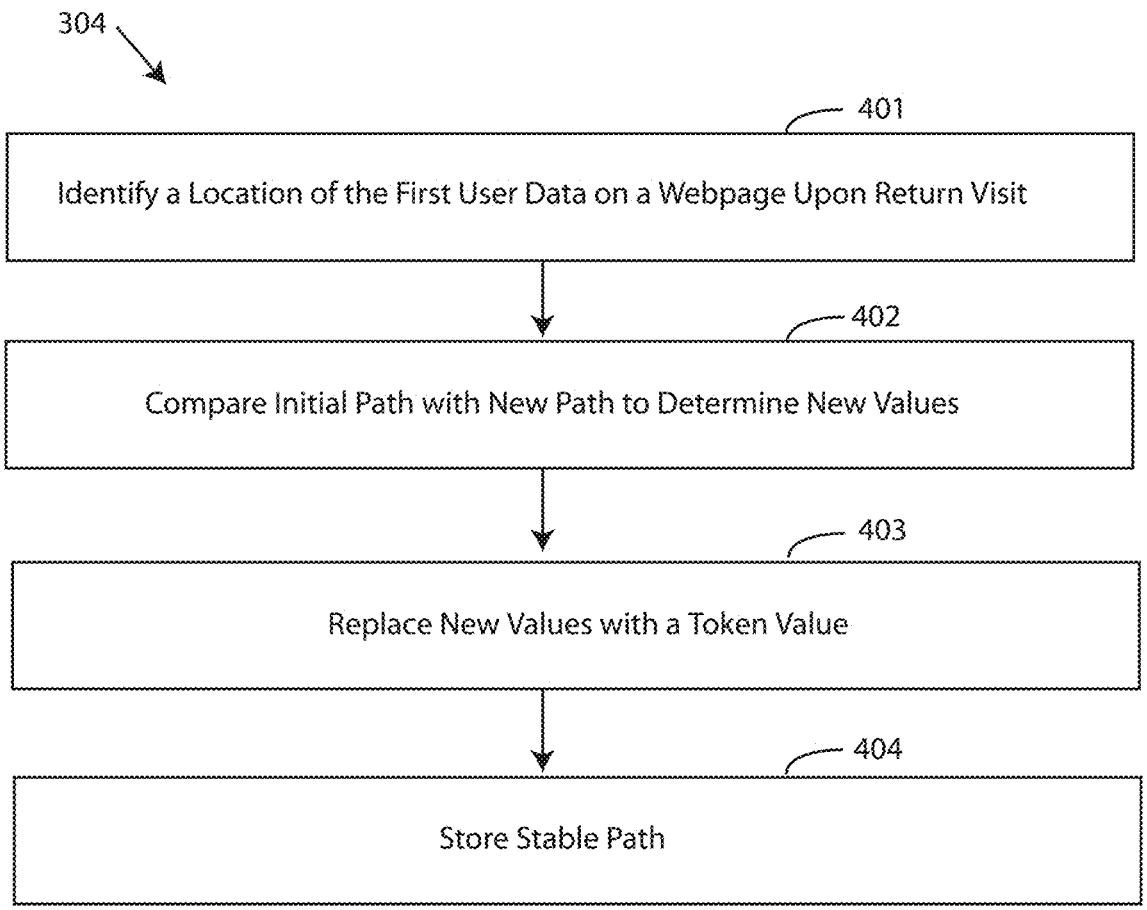
FIG. 9 depicts a flow chart of a step of the method for automatically masking sensitive user information on a webpage of FIG. 8, in accordance with embodiments of the present invention.

FIG. 9 depicts a flow chart of a step 304 of the method 300 for automatically masking sensitive user information on a webpage of FIG. 8, in accordance with embodiments of the present invention. For instance, updating the initial path may begin at step 401 wherein a location of a first user data on the webpage is identified upon a return visit to the webpage. Step 402 compares the initial path with a new path to determine new values, which may reflect a change in an access point in time of the webpage by the user. Step 403 replaces the new values with a token value to obtain a stable path resistant to changes due to time differences between paths. Step 404 stores the stable path.

Referring back to FIG. 8, step 305 locates a second user data associated with a second type of sensitive data. For example, a central database that is collaboratively maintained may be accessed to determine path information associated with the second user data. Step 306 masks the first user data and the second user data, to ensure a level of privacy for user sensitive information before the webpage is shared to a third party.

Figure 10:
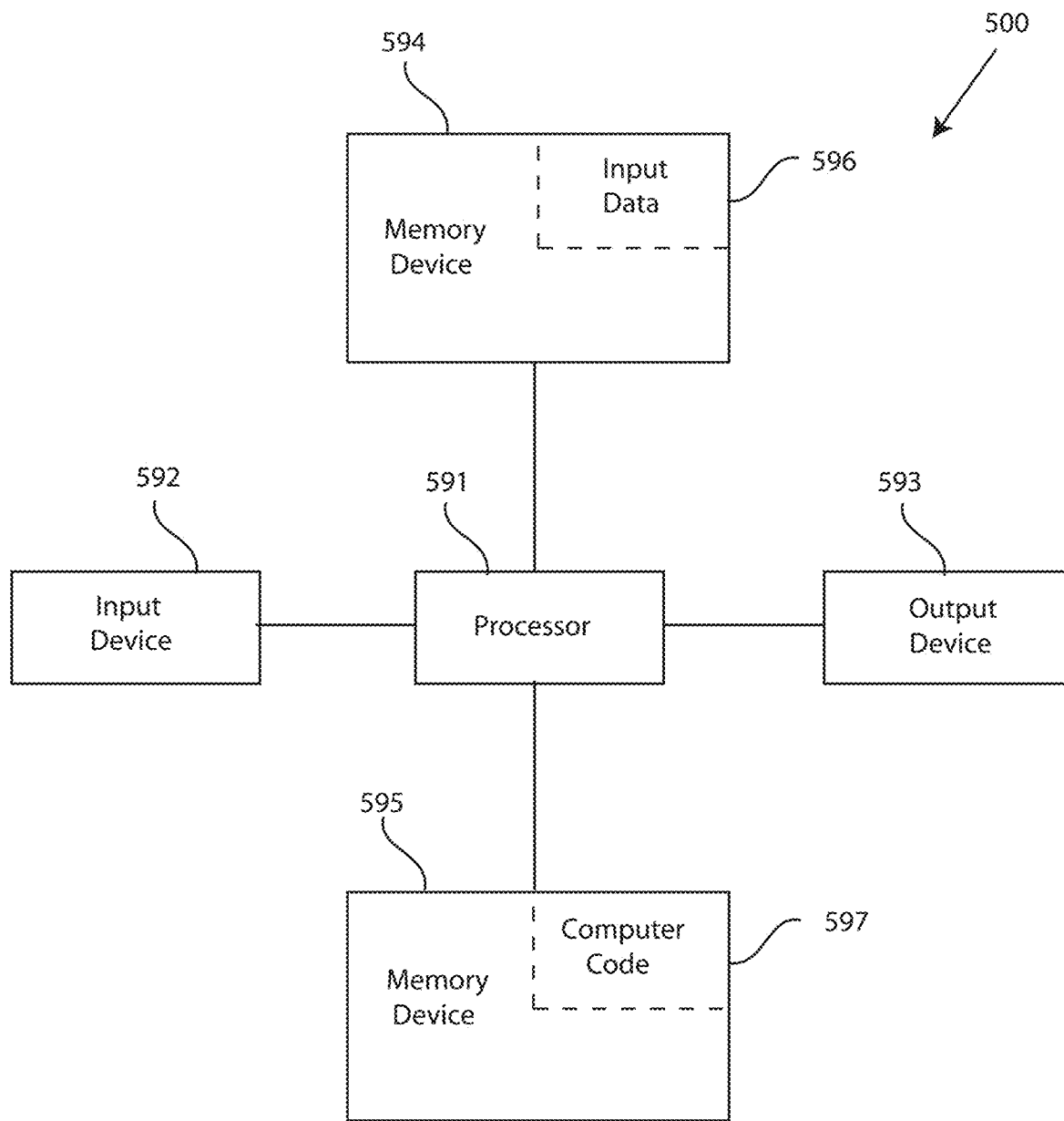
FIG. 10 illustrates a block diagram of a computer system for the smart masking system of FIGS. 1-7, capable of implementing methods for automatically masking sensitive user information on a webpage of FIGS. 8-9, in accordance with embodiments of the present invention.

FIG. 10 illustrates a block diagram of a computer system for the smart masking system of FIGS. 1-7, capable of implementing methods for automatically masking sensitive user information on a webpage of FIGS. 8-9, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code 597 for the tools and programs capable of implementing a method for automatically masking sensitive user information on a webpage, in the manner prescribed by the embodiments of FIGS. 8-9 using the smart masking system 100 of FIGS. 1-7, wherein the instructions of the computer code 597 may be executed by processor 591 via memory device 595. The computer code 597 may include software or program instructions that may implement one or more algorithms for implementing the methods for automatically masking sensitive user information on a webpage, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer readable program embodied therein and/or having other data stored therein, wherein the computer readable program comprises the computer code 597. Generally, a computer program product (or, alternatively, an article of manufacture) of the computer system 500 may comprise said computer usable storage medium (or said program storage device).

Memory devices 594, 595 include any known computer readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 10.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the touchscreen of a mobile device. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to masking systems and methods. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer 500) including one or more processor(s) 591, wherein the processor(s) carry out instructions contained in the computer code 597 causing the computer system to mask sensitive information. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method for automatically masking sensitive user information on a webpage. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for automatically masking sensitive user information on a webpage.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
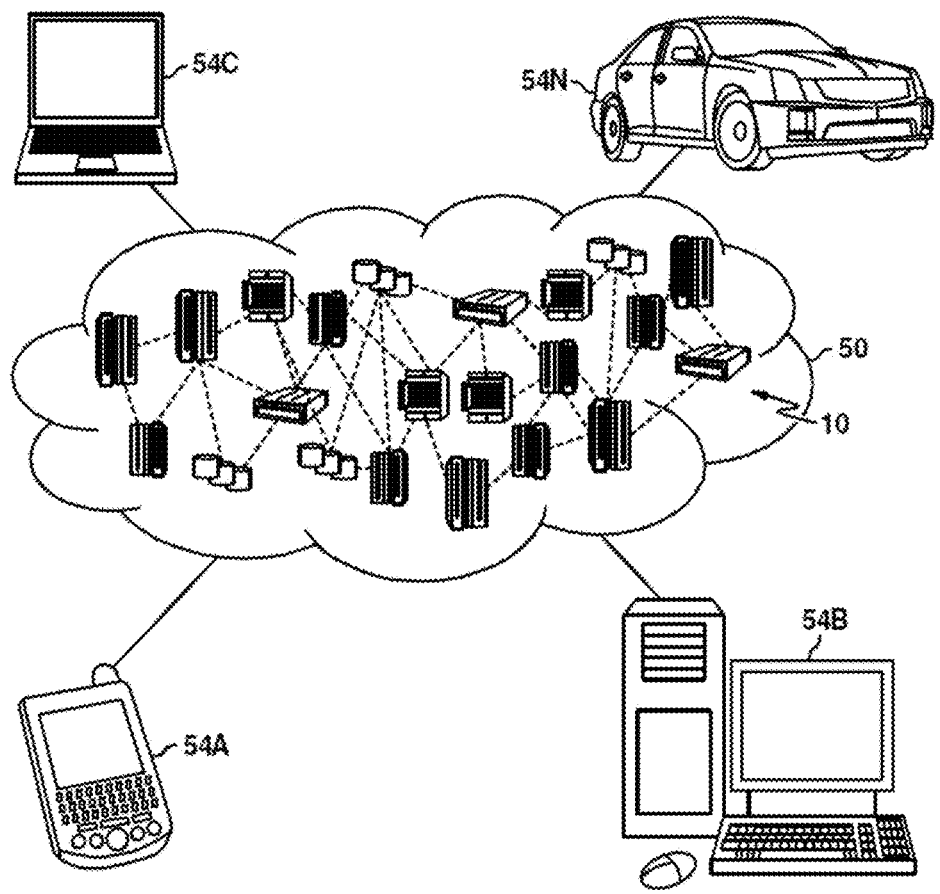
FIG. 11 depicts a cloud computing environment, in accordance with embodiments of the present invention.

Referring now to FIG. 11, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 11 are intended to be illustrative only and that computing nodes 10 and cloud computing environment 50 can communicate with any type of computerized device over any type of network and/or network addressable connection (e.g., using a web browser).

Figure 12:
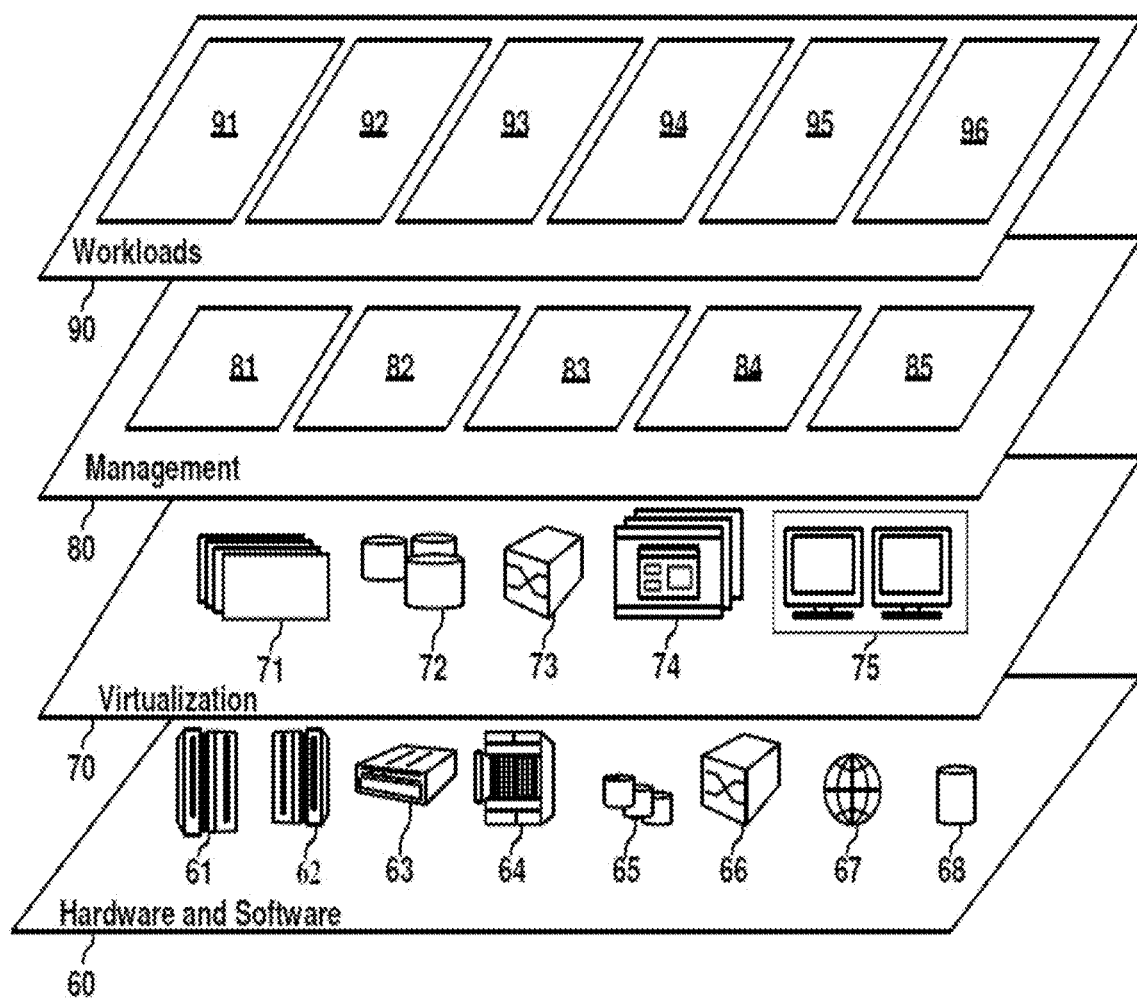
FIG. 12 depicts abstraction model layers, in accordance with embodiments of the present invention.

Referring now to FIG. 12, a set of functional abstraction layers provided by cloud computing environment 50 (see FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and masking of sensitive information 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein

What is claimed is:

1. A method for automatically masking sensitive user information on a webpage, the method comprising:
   storing, by a processor of a computing system, an initial path defining a first location of user data associated with sensitive user information on the webpage, in response to an initial visit to the webpage;
   in response to a subsequent visit to the webpage, obtaining, by the processor, a new path to the user data on the webpage, the new path including at least one value that is different than the first path and attributable to a time difference between the initial visit and the subsequent visit to the webpage;
   creating, by the processor, a stable path to the user data that replaces the at least one value with a token value such that the stable path is resistant to the time difference;
   storing, by the processor, the stable path; and
   masking, by the processor, the first user data on the webpage using the Mable path.

2. The method of claim 1, wherein the user data is obtained by accessing an autofill database.

3. The method of claim 1, wherein the user data is identified by scanning the webpage.

4. The method of claim 1, further comprising maintaining, by the processor, a central database containing path information to a location of other user data of a different type of data than the user data on the webpage by: (i) analyzing a times amp associated with a path information entry and removing old entries from the central database, (ii) removing path information that no longer corresponds to a correct location on the webpage, and (iii) continuously receiving new path information from other users.

5. The method of claim 4, wherein the user data is a first type of sensitive user information and the other user data is associated with a second type of sensitive user information that is less distinctive and harder to locate on the webpage than the first type of sensitive user information.

6. The method of claim 1, wherein a central database that is accessed as a function of the locating is a shared pool of hashed data related to path information for another type of sensitive user information, such that other users send path information pertaining to personal data of the other users data associated with the another type of sensitive user information, further wherein a privacy of the other user data is protected by hashing the other user data and path information.

7. A computer system, comprising:
a processor;
a memory device coupled to the processor; and
a computer readable storage device coupled to the processor, wherein the storage device contains program code executable by the processor via the memory device to implement a method for automatically masking sensitive user information on a webpage, the method comprising:
  storing, by a processor of a computing system, an initial path defining a first location of user data associated with sensitive user information on the webpage, in response to an initial visit to the webpage;
  in response to a subsequent visit to the webpage, obtaining, by the processor, a new path to the user data on the webpage, the new path including at least one value that is different than the first path and attributable to a time difference between the initial visit and the subsequent visit to the webpage;
  creating, by the processor, a stable path to the user data that replaces the at least one value with a token value such that the stable path is resistant to the time difference;
  storing, by the processor, the stable path; and
  masking, by the processor, the first user data on the webpage using the stable path.

8. The computer system of claim 7, wherein the user data is obtained by accessing an autofill database.

9. The computer system of claim 7, wherein the user data is identified by scanning the webpage.

10. The computer system of claim 7, further comprising maintaining, by the processor, a central database containing path information to a location of other user data of a different type of data than the user data on the webpage by: (i) analyzing a timestamp associated with a path information entry and removing old entries from the central database, (ii) removing path information that no longer corresponds to a correct location on the webpage, and (iii) continuously receiving new path information from other users.

11. The computer system of claim 10, wherein the user data is a first type of sensitive user information and the other user data is associated with a second type of sensitive user information that is less distinctive and harder to locate on the webpage than the first type of sensitive user information.

12. The computer system of claim 7, wherein a central database that is accessed as a function of the locating is a shared pool of hashed data related to path information for another type of sensitive user information, such that other users send path information pertaining to personal data of the other users data associated with the another type of sensitive user information, further wherein a privacy of the other user data is protected by hashing the other user data and path information.

13. A computer program product, comprising a computer readable hardware storage device storing a computer readable program code, the computer readable program code comprising an algorithm that when executed by a computer processor of a computing system implements a method for automatically masking sensitive user information on a webpage, the method comprising:
  storing, by a processor of a computing system, an initial path defining a first location of user data associated with sensitive user information on the webpage, in response to an initial visit to the webpage;
  in response to a subsequent visit to the webpage, obtaining, by the processor, a new path to the user data on the webpage, the new path including at least one value that is different than the first path and attributable to a time difference between the initial visit and the subsequent visit to the webpage;
  creating, by the processor, a stable path to the user data that replaces the at least one value with a token value such that the stable path is resistant to the time difference;
  storing, by the processor, the stable path; and
  masking, by the processor, the first user data on the webpage using the stable path.

14. The computer program product of claim 13, wherein the user data is obtained by accessing an autofill database.

15. The computer program product of claim 13, further comprising maintaining, by the processor, a central database containing path information to a location of other user data of a different type of data than the user data on the webpage by: (i) analyzing a timestamp associated with a path information entry and removing old entries from the central database, (ii) removing path information that no longer corresponds to a correct location on the webpage, and (iii) continuously receiving new path information from other users.

16. The computer program product of claim 15, wherein the user data is a first type of sensitive user information and the other user data is associated with a second type of sensitive user information that is less distinctive and harder to locate on the webpage than the first type of sensitive user information.

17. The computer program product of claim 13, wherein a central database that is accessed as a function of the locating is a shared pool of hashed data related to path information for another type of sensitive user information, such that other users send path information pertaining to personal data of the other users data associated with the another type of sensitive user information, further wherein a privacy of the other user data is protected by hashing the other user data and path information.

* * * * *